US007526428B2

(12) United States Patent
Chamberlain

(10) Patent No.: US 7,526,428 B2
(45) Date of Patent: Apr. 28, 2009

(54) SYSTEM AND METHOD FOR NOISE CANCELLATION WITH NOISE RAMP TRACKING

(75) Inventor: Mark Walter Chamberlain, Honeoye Falls, NY (US)

(73) Assignee: Harris Corporation, Melbourne, FL (US)

( * ) Notice: Subject to any disclaimer, the term of this patent is extended or adjusted under 35 U.S.C. 154(b) by 842 days.

(21) Appl. No.: 10/678,222

(22) Filed: Oct. 6, 2003

(65) Prior Publication Data

US 2005/0075870 A1 Apr. 7, 2005

(51) Int. Cl.

| | |
|---|---|
| ***G10L 21/02*** | (2006.01) |
| ***G10L 19/14*** | (2006.01) |
| ***G10L 11/06*** | (2006.01) |
| ***G10L 15/20*** | (2006.01) |

(52) U.S. Cl. ....................... 704/226; 704/205; 704/210; 704/215; 704/233

(58) Field of Classification Search .................. 704/210
See application file for complete search history.

(56) References Cited

U.S. PATENT DOCUMENTS

| | | | | |
|---|---|---|---|---|
| 5,012,519 | A * | 4/1991 | Adlersberg et al. | 704/226 |
| 6,098,038 | A * | 8/2000 | Hermansky et al. | 704/226 |
| 6,415,253 | B1 * | 7/2002 | Johnson | 704/210 |
| 6,453,291 | B1 * | 9/2002 | Ashley | 704/233 |
| 2003/0035549 | A1 * | 2/2003 | Bizjak et al. | 381/56 |

OTHER PUBLICATIONS

"Suppression of Acoustic Noise in Speech Using Spectral Subtraction," Steven F. Boll IEEE Transactions on Acoustics, Speech, and Signal Processing, vol. ASSP-27, No. 2, Apr. 1979.

* cited by examiner

*Primary Examiner*—David R Hudspeth
*Assistant Examiner*—Brian L Albertalli
(74) *Attorney, Agent, or Firm*—Duane Morris LLP

(57) ABSTRACT

A system and method for noise cancellation with noise ramp tracking in the presence of severe or ramping acoustic noise. The system conducts an estimation of the noise level in the input signal and modifies the signal based upon this noise estimate. A windowed Fourier transform is performed upon the input speech signal and an estimation of a histogram of the frequency magnitudes of the noise level and other related parameters is generated and used to compute a spectral gain function that is applied to components of the Fourier transform of the input speech signal. The enhanced components of the Fourier transform are processed by an inverse Fourier transform in order to reconstruct a noise reduced speech signal.

42 Claims, 6 Drawing Sheets

SYSTEM AND METHOD FOR NOISE CANCELLATION WITH NOISE RAMP TRACKING

BACKGROUND

The use of higher order statistics for noise suppression and estimation is well known. With higher order statistics it has been possible to derive more information from a received signal than with second order statistics which have commonly been used in telecommunications. For example, the phase of the transmission channel may be derived from the stationary received signal using higher order statistics. Another benefit of higher order statistic noise suppression is the suppression of Gaussian noise.

One such higher order statistic noise suppression method is disclosed by Steven F. Boll in "Suppression of Acoustic Noise in Speech Using Spectral Subtraction", IEEE Transactions on Acoustics, Speech, and Signal Processing, VOL. ASSP-27, No. 2, April 1979. This spectral subtraction method comprises the systematic computation of the average spectra of a signal and a noise in some time interval and afterwards through the subtraction of both spectral representations. Spectral subtraction assumes (i) a signal is contaminated by a broadband additive noise, (ii) a considered noise is locally stationary or slowly varying in short intervals of time, (iii) the expected value of a noise estimate during an analysis is equal to the value of the noise estimate during a noise reduction process, and (iv) the phase of a noisy, pre-processed and noise reduced, post-processed signal remains the same. Spectral subtraction and known higher order statistic noise suppression methods encounter difficulties when tracking a ramping noise source and do little to reduce the noise contamination in a ramping, severe or non-stationary acoustic noise environment.

For example, FIG. 1 illustrates speech of a male speaker ("Tom's birthday is in June", "Frank's neighbor mowed his lawn", "Clip the pens on the books") in the presence of Gaussian acoustic noise. The illustrated Gaussian noise source contains an amplitude increased ramp at a one dB/second rate. Many noise cancellation algorithms have difficulty tracking a moving noise source of this type. A real world example of this condition is speech that is recorded in a stationary noise level environment such as in recording speech outdoors with a car passing at a distance to the recording device. The noise increases with a relatively constant level and then decreases back down to a fixed stationary level.

FIG. 2 illustrates speech of a female speaker ("Do not drink the Coke fast", "Please rent the car to him", "Invest your money now") recorded in the presence of CH-47 helicopter noise. The helicopter noise source is characterized by non-stationary noise and loud volumes resulting in poor Signal-to-Noise-Ratio (SNR) conditions. Typically, digital voice systems are often completely unusable for communications in the presence of such non-stationary noise. Hence, there exists a need in the art for a system and method to improve the intelligibility and quality of speech in the presence of ramping, severe or non-stationary acoustic noise environments.

Therefore, it is an object of the disclosed subject matter to overcome these and other problems in the art and present a novel method and system for noise cancellation with noise ramp tracking in the presence of ramping, severe or non-stationary acoustic noise environments.

It is an object of the disclosed subject matter to present a novel method to reduce the noise source of an input speech signal in a telecommunications system using minimal computational complexity. It is a further object to estimate the noise level present in an input speech signal when the noise source is ramping up or down in amplitude (at least 2-3 dB/second), to correctly identify speech segments from noise only segments so that speech may not degrade when noise levels are varied in amplitude, and to automatically adapt the resulting post-processed noise level to a suitable level even when noise is not present in the input speech.

It is also an object of the disclosed subject matter to present a novel method to filter the noise source of an input speech signal by estimating the noise level present, modify the input speech signal based on the noise estimate, identify and separate speech segments from noise only segments, and adapt post-processed noise levels to an acceptable level.

It is a further object of the disclosed subject matter to present a novel method of noise cancellation by applying a windowed Fourier transform to an input speech signal, estimating the noise level present in an input speech signal, modifying the input speech signal based on the noise estimate, identifying speech segments from the noise only segments, and adapting post-processed noise levels to acceptable levels.

It is an object of the disclosed subject matter to present a novel system for noise cancellation in a severe acoustic environment comprising an input device operably connected to a processor, a processor operably connected to an electronic memory and storage device wherein the processor conducts a noise cancellation technique, a filter for adapting post-processed noise levels to acceptable levels, a storage device operably connected to the processor for storing and applying noise histograms for further noise processing, and an output device operably connected to the processor for communicating the output speech signal.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

The subject matter of the disclosure will be described with reference to the following drawings.

DETAILED DESCRIPTION OF DRAWINGS

Embodiments of the disclosed subject matter enhance a speech input signal through an estimation of the noise level in the input signal and a modification based upon this noise estimate. The estimation of the noise level is made in the frequency domain after performing a windowed Fourier transform on the input speech signal. A histogram of the frequency magnitudes of the noise level and other related parameters is generated, estimated and used to compute a spectral gain function that is multiplied with the real and imaginary components of the Fourier transform of the input speech signal. The enhanced components of the Fourier transform may then be processed by an inverse Fourier transform to reconstruct the noise reduced speech signal.

Figure 1:
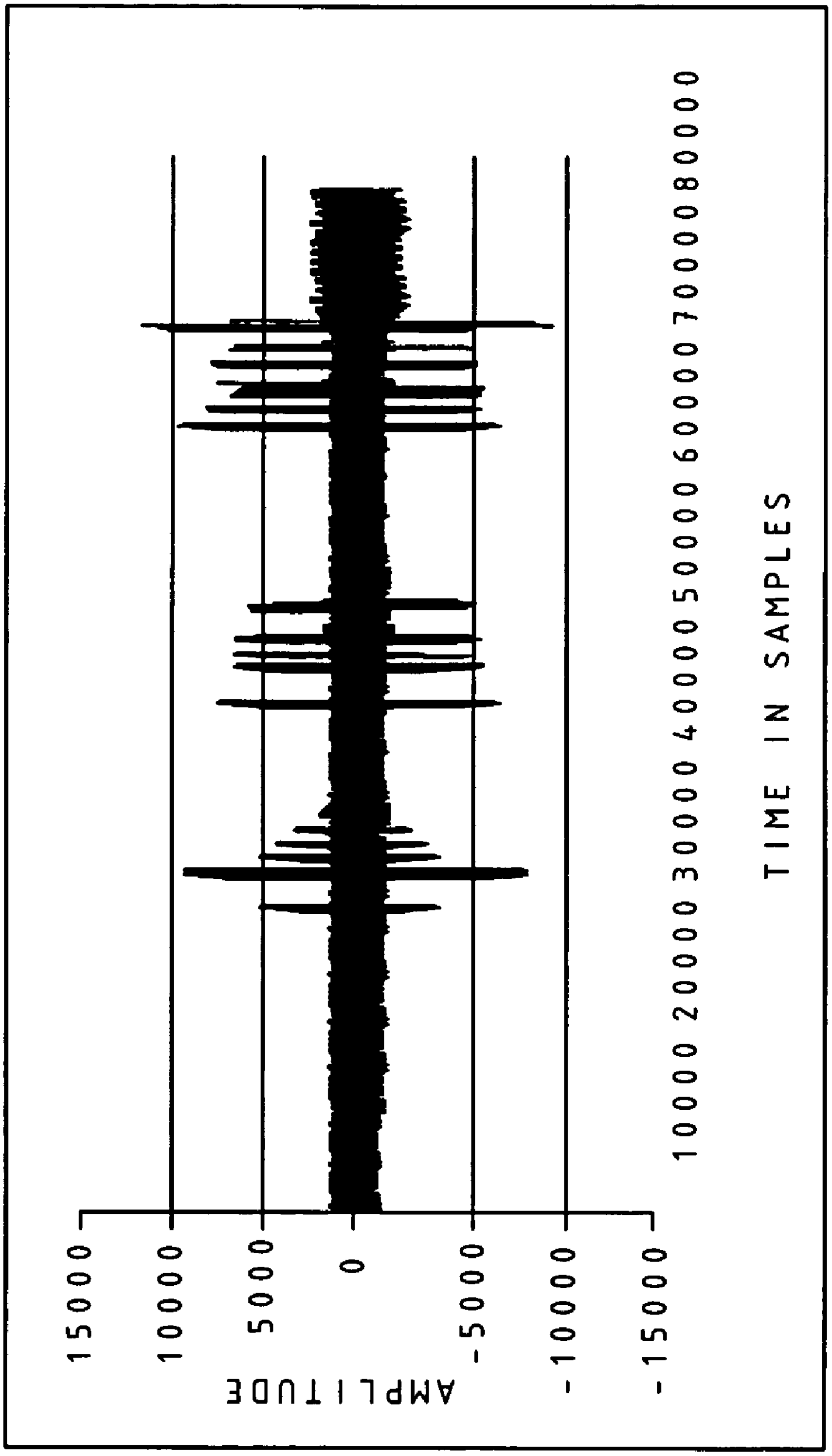
FIG. 1 illustrates input speech in the presence of Gaussian acoustic noise with a ramping noise level increase of 1 dB per second (male speaker—"Tom's birthday is in June", "Frank's neighbor mowed his lawn", "Clip the pens on the books")
Figure 3:
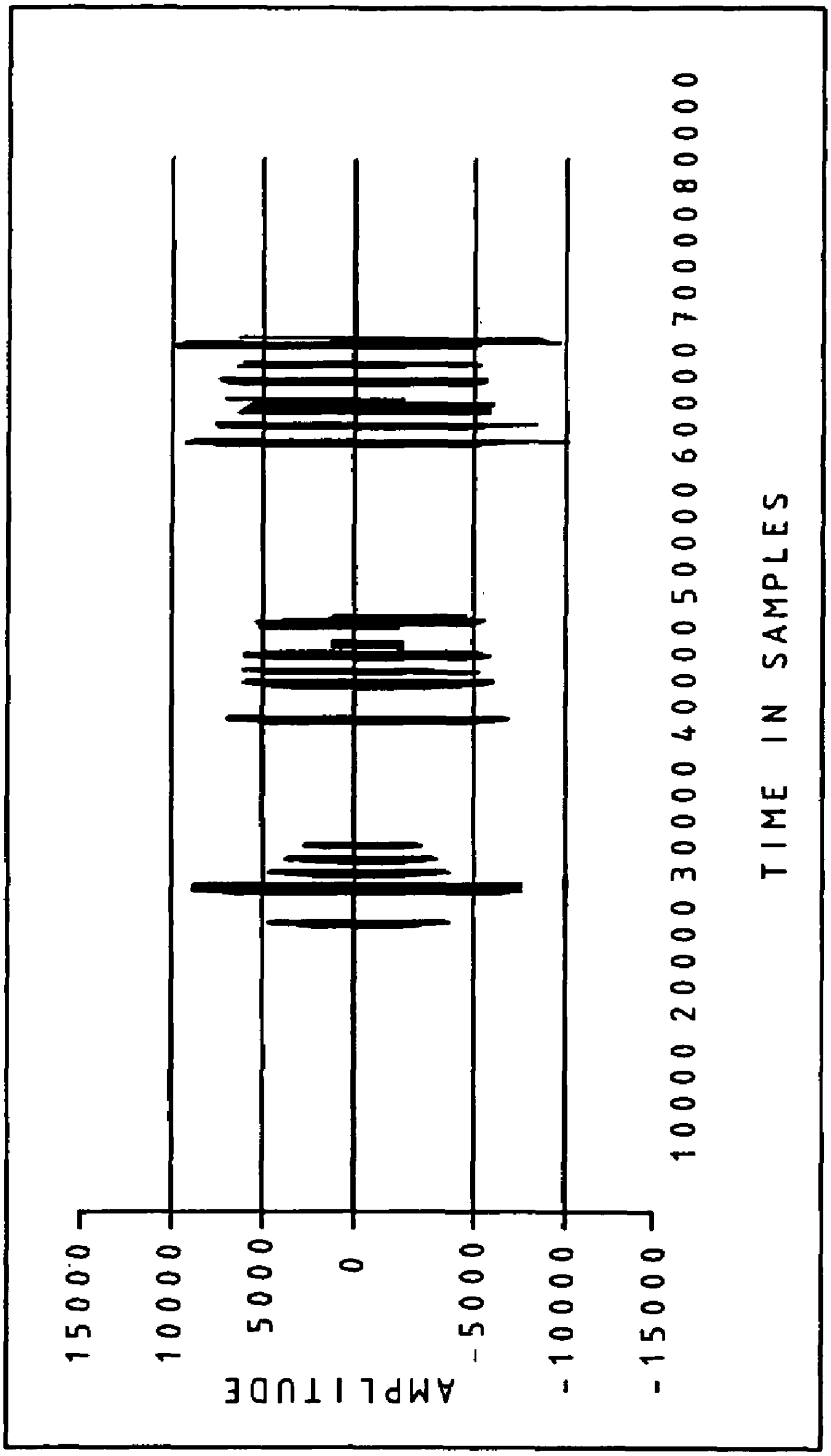
FIG. 3 illustrates the noise reduced output speech for the input speech shown by FIG. 1.

FIG. 3 illustrates the enhanced speech output for the input speech signal shown by FIG. 1. An embodiment of the disclosed subject matter tracks the Gaussian noise source containing an amplitude ramp increased at a 1 dB/second rate and effectively reduces the noise to acceptable noise levels. A voice activity detector 507, as illustrated by FIG. 5, detects and compensates the ramping noise.

Figure 2:
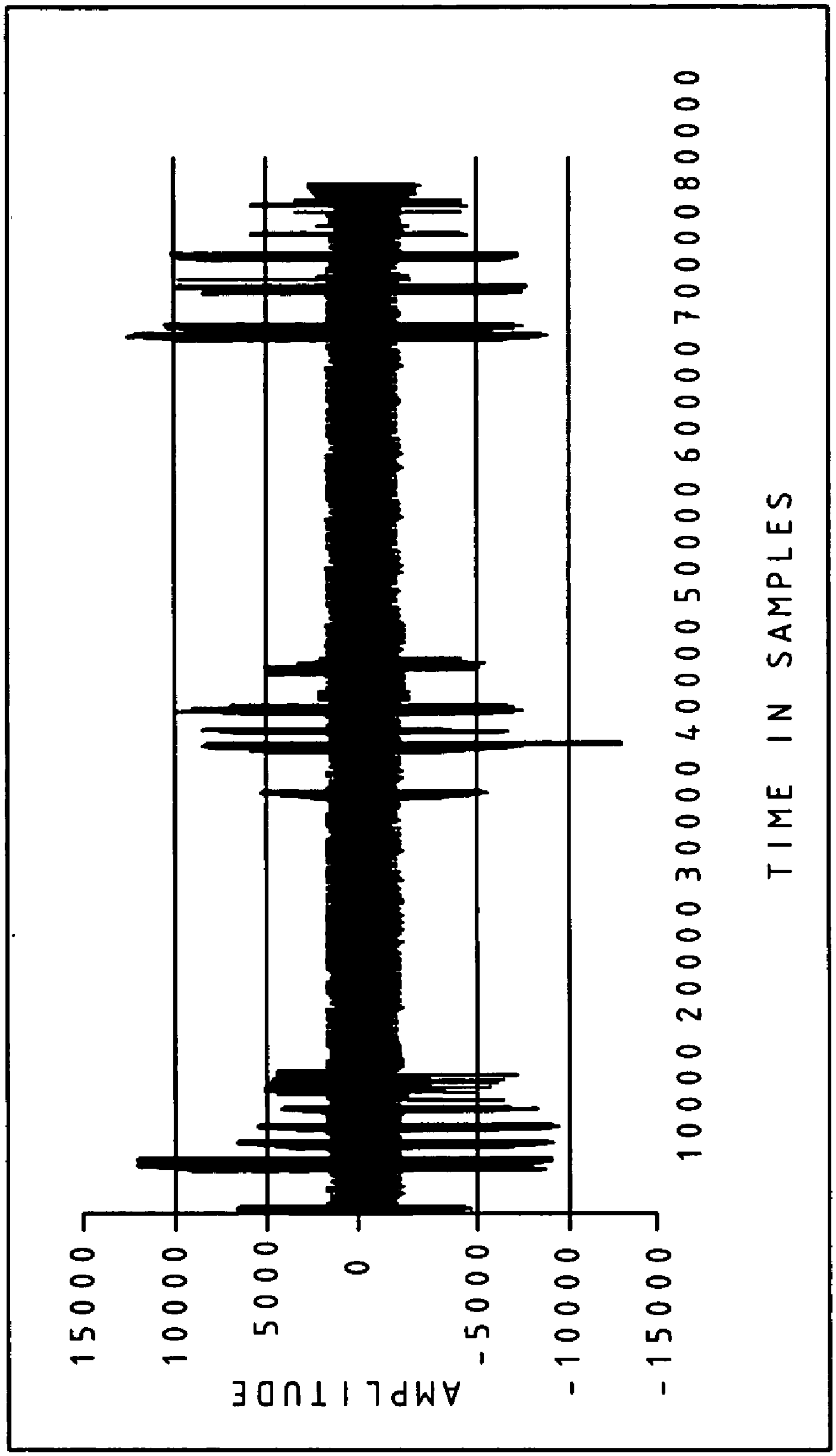
FIG. 2 illustrates input speech in the presence of CH47 Helicopter noise (female speaker—"Do not drink the Coke fast", "Please rent the car to him", "Invest your money now")
Figure 4:
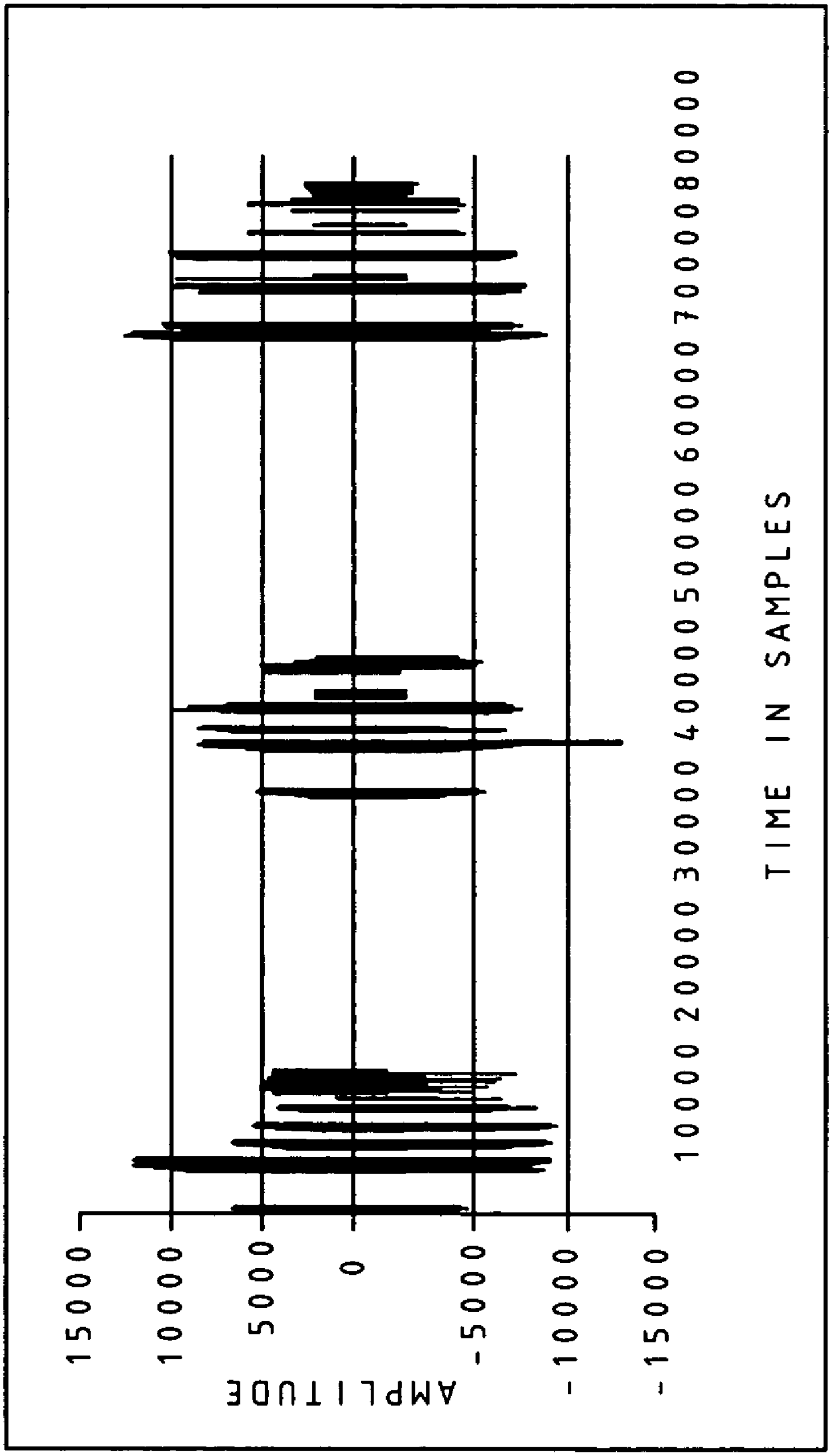
FIG. 4 illustrates the noise reduced output speech for the input speech shown by FIG. 2.

FIG. 4 illustrates the enhanced speech output for the input speech signal shown by FIG. 2. The resultant speech output has been noise compensated and may be perceived as noise-free. As exemplified by FIG. 4, noise in unvoiced speech segments has been reduced by approximately 20 dB. It is also shown that noise levels in voiced segments have been reduced to a level that provides a Signal-to-Noise Ratio ("SNR") improvement and perceived quality enhancement. Though this example of non-stationary noise may be considered a difficult noise type to reduce or compensate, an embodiment of the disclosed subject matter provides speech that may be suitable for communications.

Figure 5:
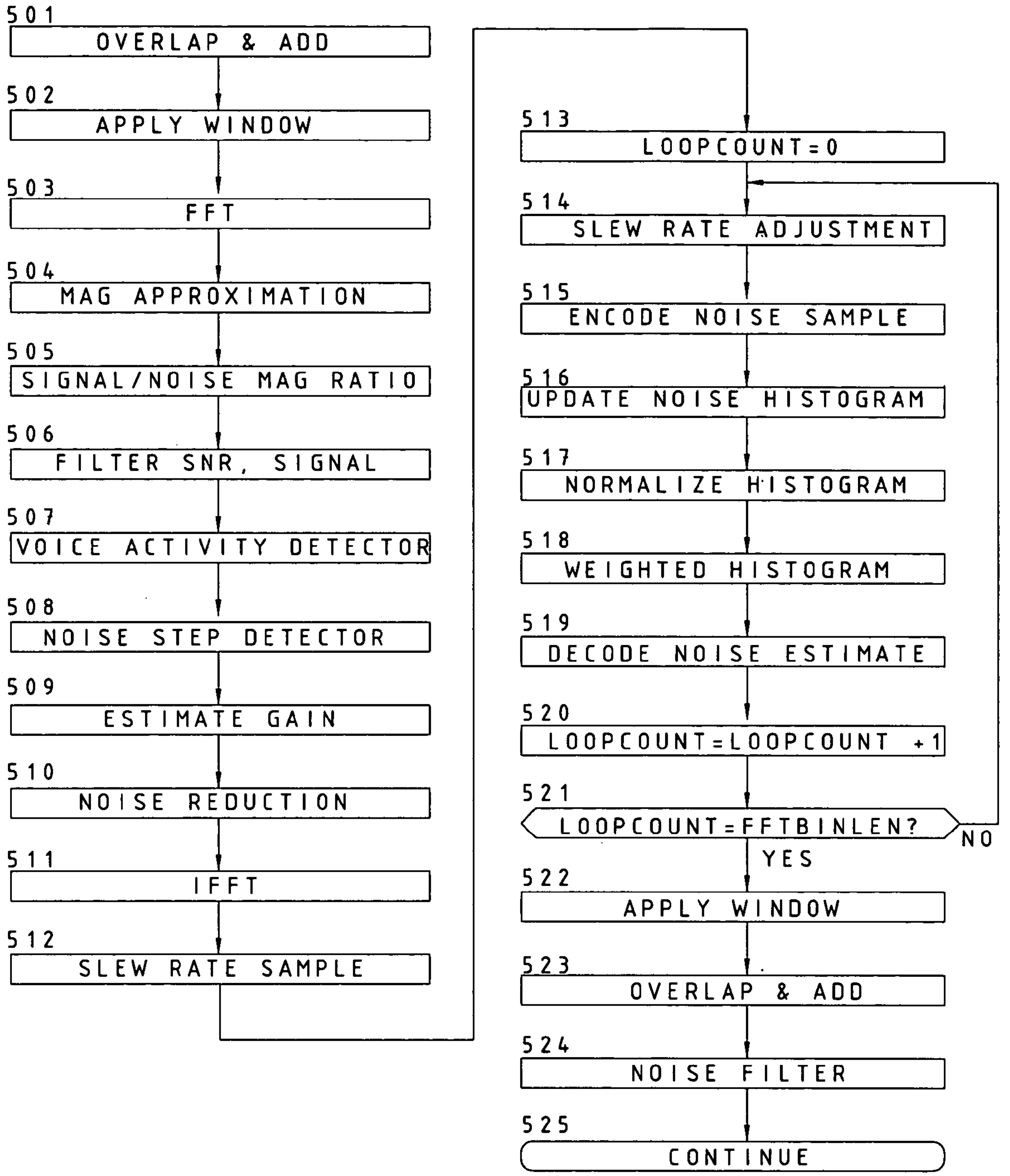
FIG. 5 illustrates the flowchart of the noise cancellation algorithm according to the invention.

An embodiment for enhancing speech output for an input noise source is illustrated by FIG. 5. FIG. 5 represents a specific embodiment in which an input speech signal is enhanced by an estimation of a noise level in the input speech signal. A windowed Fourier transform may then be applied to the input speech signal. The windowed Fourier transform controls the spectral leakage between frequency bins of the Fourier transform by controlling the bandwidth of each frequency bin. An application and modification of a histogram is used to compute a gain function of the input signal which may be applied to the components of the input signal after the application of the windowed Fourier transform. Processing of this modified signal may be conducted using an inverse Fourier transform to produce a noise reduced speech output signal.

As shown in Block 501, an encoded input speech signal may be overlapped and added with previous input signals. The input speech signal may be assigned a frame size respective to its overlapped state. As shown in Blocks 502 and 503, a windowed Fourier transform is applied to the real and imaginary components of the input speech signal. The magnitude of the input speech signal may be approximated through an absolute value estimation in the frequency domain after the performance of the windowed Fourier transform as shown in Block 504.

Block 505 represents a computation of the input speech signal Signal-to-Noise Ratio ("SNR") magnitudes. As shown, a magnitude approximation of the input speech signal may be multiplied by an arbitrary value and divided by the noise level of the input speech signal. An SNR maximum value may be assigned according to the magnitude approximation and forwarded to a filter as exemplified in Block 506. The filter computes an average SNR magnitude through a total summation of SNR magnitude extremes and of a doubling of the sum of all intermediate SNR magnitudes. The total summation is divided by an arbitrary value to compute an average SNR magnitude. The filter further computes an average input speech signal magnitude through a total summation of signal magnitude extremes and of a doubling of the sum of all intermediate signal magnitudes. The total summation is divided by an arbitrary real value to compute an average input speech signal magnitude.

As depicted by Block 507, a voice activity detector may detect and attack a ramping, Gaussian or non-stationary noise signal through conditional comparisons between maximum SNR magnitudes and a maximum SNR threshold, the SNR average magnitude and an average SNR threshold, and a weighted average signal magnitude and an average noise magnitude multiplied by an average SNR threshold. As exemplified by Block 508, a noise step detector detects and attacks a large noise step increase or decrease in amplitude or magnitude and generates a histogram of the frequency magnitudes of the noise level and other related parameters through a conditional comparison and assignment of historical voice activity detection values, historical signal values and noise step values. As represented by Block 509, a spectral gain function is estimated in the input speech signal through conditional comparisons of the input speech signal's noise level, signal gain, and other related parameters.

As depicted by Block 510, the spectral gain function computed and estimated in Block 509 is utilized to reduce noise in the input speech signal through a multiplicative application applied to the real and imaginary components of the Fourier transform of the input speech signal. The input speech signal may then be processed by an inverse Fourier transform, as illustrated by Block 511, to reconstruct a noise reduced speech signal prior to a slew rate adjustment. As depicted by Block 512, a sample of the slew rate from the noise reduced speech signal is taken and an error count is applied to the slew rate dependent upon the signal magnitude.

As illustrated in Block 514, the slew rate is adjusted in the frequency domain through conditional comparisons and computations of error periods, error counts, histograms and peak indices of the input speech signal and other parameters. If the histogram of the sample is greater than a peak of the sample, then the value of the peak is assigned the histogram value and a peak index is assigned an arbitrary value. However, if the peak value of the sample is greater than zero and the peak index is greater or less than zero and greater or less than an arbitrary value, then the histogram values may be adjusted higher if an error function is greater than an upper slew value or the histogram values may be adjusted lower if the error function is lower than a lower slew value. After slew rate adjustment, the sample may be encoded as represented in Block 515 by indexing the signal magnitude. Further, a noise histogram may be updated as a function of an encoded noise sample as depicted in Block 516, and the noise histogram may be normalized as exemplified in Block 517 through further conditional comparisons and computations of the updated noise histogram value and a maximum historical value. If the updated noise histogram is greater than the maximum historical value, the histogram may be scaled down or normalized as a function of the difference between the updated noise histogram and the maximum historical value. As represented by Block 518, a weighted histogram bin is computed through a summation of the normalized histogram and indexed by a weighted mean. A noise estimate may then be decoded according to the weighted histogram computation and index as illustrated in Block 519. Further slew rate adjustment may be conducted depending upon the frequency domain of the reconstructed noise reduced speech signal.

After slew rate adjustment is complete, a windowed Fourier transform is multiplicately applied to the components of an output speech signal as depicted by Block 522. The output speech signal may be overlapped and added with previous output signals after a performance of the windowed Fourier transform as illustrated in Block 523. Further, the output speech signal may be assigned a frame size respective to its overlapped state.

A noise filter, as exemplified by Block 524, may filter any average remaining noise component of the output speech signal through a total summation of noise magnitude extremes and of a doubling of the sum of all intermediate noise magnitudes. The summation is divided by a predetermined value to compute an average noise magnitude. The noise cancellation process may be continued if further input speech signals or if new speech frames are present.

A representative algorithm of an embodiment of the noise cancellation process exemplified in FIG. 5 is shown below for illustrative purposes only and is not intended to limit the scope of the described method.

Generic algorithm

```
Magnitude Approximation
MagApproximation (x,y)
{x = abs(x)
  y = abs(y)
  if (x<y)
    {temp = x
    x = y
    y = temp}
 if (x>8*y) temp = x
    else {temp = (15*x+7*y)/16}
 return(temp)}
EncodeSample(x)
{index = 0
big = MAX_POS_VAL
  for j = 0 to 127
    {temp = abs(ENCODE_TABLE[j] − x)
    if (temp<big)
      {big = temp
      index = j}}
  return(index)}
  Block 501 Overlap and add with previous input
  SpeechInput[0,...,OVERLAP−1] =
    SpeechInput[FRAMESIZE,...,FFTSIZE−1]
  SpeechInput[OVERLAP,...,FFTSIZE−1] =
    AudioInput[0,...,FRAMESIZE−1]
  Block 502 Apply windowed Fourier Transform
  Sig[0,...,FFTSIZE−1] =
    WINDOW[0,...,FFTSIZE−1]*SpeechInput[0,...,FFTSIZE−1]
  Block 503 Apply Fourier Transform
  Sig[0,...,FFTSIZE−1] =
    FFT(Sig[0,...,FFTSIZE−1]) {256 point real value FFT}
  Block 504 Magnitude Approximation
  SigMag[0] = abs(Sig[0])
  SigMag[1,...,FFTBINLEN−2] =
    MagApproximation(Sig[1,...,FFTBINLEN−2], Sig[FFTLEN−
  1,...,FFTLEN-FFTBINLEN+2])
  SigMag[FFTBINLEN−1] = abs(Sig[FFTBINLEN−1])
  Block 505 Compute SNR magnitudes
  Snr[0,...,FFTBINLEN−1] =
    256*SigMag[0,...,FFTBINLEN− 1]/Noise[0,...,FFTBNILEN−1]
  SnrMax = MAX(Snr[0,...,FFTBINLEN−1])
  Block 506 Filter SNR and signal magnitudes
  SnrAvg = (Snr[0] + Snr[128] + 2*SUM(Snr[1,...,127]))/256
  AvgSignalMag =
    (SigMag[0] + SigMag[128] + 2*SUM(SigMag[1,...,127]))/256
  Block 507 Voice Activity Detector
  NoiseFlag = 0
  If (SnrMax < MAX_SNR_THRESHOLD &&
    SnrAvg < AVG_SNR_THRESHOLD)
    NoiseFlag = 1
  If (256*AvgSignalMag >
    AVG_SNR2_THRESHOLD*AvgNoiseMag) NoiseFlag = 0
  Block 508 Noise Step Detector
  All Voice = 1
  If (VADHist[0,...,31] == 0) AllVoice = 0
  Max = 0
  Min = MAX_POS_VAL
  If (SignalHist[0,...,31] > Max) Max = SignalHist[0,...,31]
  If (SignalHist[0,...,31] < Min) Min = SignalHist[0,...,31]
  If (ALLVoice &&Max < 2*Min &&NoiseStep == 0)
  {NoiseStep = 32
   Histogram[0,...,FFTBINLEN−1][0,...,127] = 0
```

-continued

Generic algorithm

```
   Noise[0,...,FFTBINLEN−1] = SigMag[0,...,FFTBINLEN−1]}
  else if (NoiseStep > 0) NoiseStep = NoiseStep−1
  SignalHist[31,...,1] = SignalHist[30,...,0]
  VADHist[31,....,1] = VADHist[30,...,0]
  SignalHist[0] = AvgSignalMag
  VADHist[0] = NoiseFlag XOR 1
  Block 509 Estimate gain
  for j = 0 to FFTBINLEN−1
  {acc = 256*MAX_GAIN
   if (Snr[j] <> 0) acc = acc/Snr[j]
   if (acc> MAX_GAIN) acc = MAX_GAIN
   Nsr = acc
   Temp = (Nsr*SCALE1 + OldNsr[j]*SCALE2)
   Hgain[j] = MAX_GAIN − temp
   If (NoiseFlag) Hgain[j] = MINGAIN
   Else
    {if (Snr[j] > SNR3_THRESHOLD)Hgain[j] = MAXGAIN}
   if (Hgain[j] < MINGAIN) Hgain[j] = MINGAIN
   OldNsr[j] = Nsr}
  Block 510 Noise Reduction
  Sig[0] = Hgain[0]*Sig[0]
  Sig[1,...,FFTBINLEN−2] =
     Hgain[1,...,FFTBINLEN−2]*Sig[1,...,FFTBINLEN−2]
  Sig[FFTLEN−1,...,FFTLEN−FFTBINLEN+2] =
     Hgain[FFTLEN−1,...,FFTLEN−
     FFTBINLEN+2] * Sig[FFTLEN−1,...,FFTLEN−FFTBINLEN+2]
  Sig[FFTBINLEN−1] = Hgain[FFTBINLEN−1]*Sig[FFTBINLEN−1]
  Block 511 Inverse Fourier Transform
  Sig[0,...,FFTSIZE−1] = IFFT(Sig[0,...,FFTSIZE−1])
{real value 256 point Inverse FFT}
  SigMag[0,...,FFTBINLEN−1] = (SigMag[0,...,FFTBINLEN−1] +
    OldSigMag[0,...,FFTBINLEN−1])/2
  OldSigMag[0,...,FTBINLEN−1] = SigMag[0,...,FFTBINLEN−1]
  Block 512 Slew rate sample
  If (NoiseStep > 0) AttackRate = FAST_ATTACK_INC
  Else AttackRate = SLOW_ATTACK_INC
  If (NoiseFlag)
  {Error[0,...,128] = Error[0,...,128] + SigMag[0,...,128]*NOISE_BIAS
  ErrorCount = ErrorCount + 1}
  ErrorPeriod = ErrorPeriod + 1
  for i = 0 to FFTBINLEN−1
  Block 513 Start Counter
  LOOPCOUNT = 0
  {
    Block 514 Slew rate adjustment
    if (ErrorPeriod == 16 &&ErrorCount <> 0)
  {acc = Error[i]/ErrorCount
  acc = 256*acc/Noise[i]
  Peak = PeakIndex = 0
  For j = 0 to 127
    {if (histogram[i][j] > Peak)
      {Peak = histogram[i][j]
      PeakIndex = j}}
  if (Peak > 0 &&PeakIndex <> 0 &&PeakIndex <> 127)
    {if (acc > SLEW_UPPER)
      {histogram[i][127,...,1] = histogram[i][126,...,0]
      histogram[0] = 0}
    else if (acc < SLEW_LOWER)
      {histogram[i][0,...,126] = histogram[i][1,...,127]
      histogram[i][127] = 0}}}
  Block 515 Encode Noise Sample
  stuffindex = EncodeSample(SigMag[i])
  Block 516 Update noise histogram
  temp = histogram[i][stuffindex]
  temp = temp + AttackRate
  histogram[stuffindex] = temp
  Block 517 Normalize histogram
  if (temp >MAX_HIST_VALUE)
  {ScaleDownHist = temp − MAX_HIST_VALUE
  for j = 0 to 127
    {histogram[i][j] = histogram[i][j] − ScaledDownHist
    if (histogram[i][j] < 0) histogram[i][j]}}
  Block 518 Compute weighted histogram bin
  sum = 0
  for j = 0 to 127
  {sum = sum + histogram[i][j]}
  acc = 0
```

-continued

| Generic algorithm |
|---|
| for j = 0 to 127<br>{acc = acc + j*histogram[i][j]}<br>mean = 256*acc/sum<br>index3 = mean/256<br>Block 519 Decode noise estimate<br>Noise[i] = ENCODE_TABLE[index3] }<br>if (ErrorPeriod == 16)<br>{ErrorPeriod = ErrorCount = 0<br>Error[0,...,128] = 0}<br>Block 520 Update Counter<br>LOOPCOUNT = LOOPCOUNT + 1<br>Block 521<br>If LOOPCOUNT = FFTBINLEN, continue<br>else, GOTO Slew Rate Adjustment<br>Block 522 Apply window<br>SpeechOutput[0,...,FFTSIZE−1] =<br>WINDOW[0,...,FFTSIZE−1]*Sig[0,...,FFTSIZE−1]<br>Block 523 Overlap and add to previous output<br>SpeechOutput[0,...,OVERLAP−1] =<br>SpeechOutput[0,...,OVERLAP−1] +<br>Overlap[0,...,OVERLAP−1]<br>Overlap[0,...,OVERLAP−1] =<br>SpeechOutput[FRAMESIZE,...,FRAMESIZE+ OVERLAP−1]<br>AudioOut[0,...,FRAMESIZE−1] = SpeechOutput[0,...,FRAMESIZE−1]<br>Block 524 Noise Filter<br>AvgNoiseMag =<br>(Noise[0] + Noise[128] + 2*SUM(Noise[1,...,127))/256<br>Block 525<br>If more speech, continue process<br>if new FRAME, GOTO step 1<br>else STOP |

Figure 6:
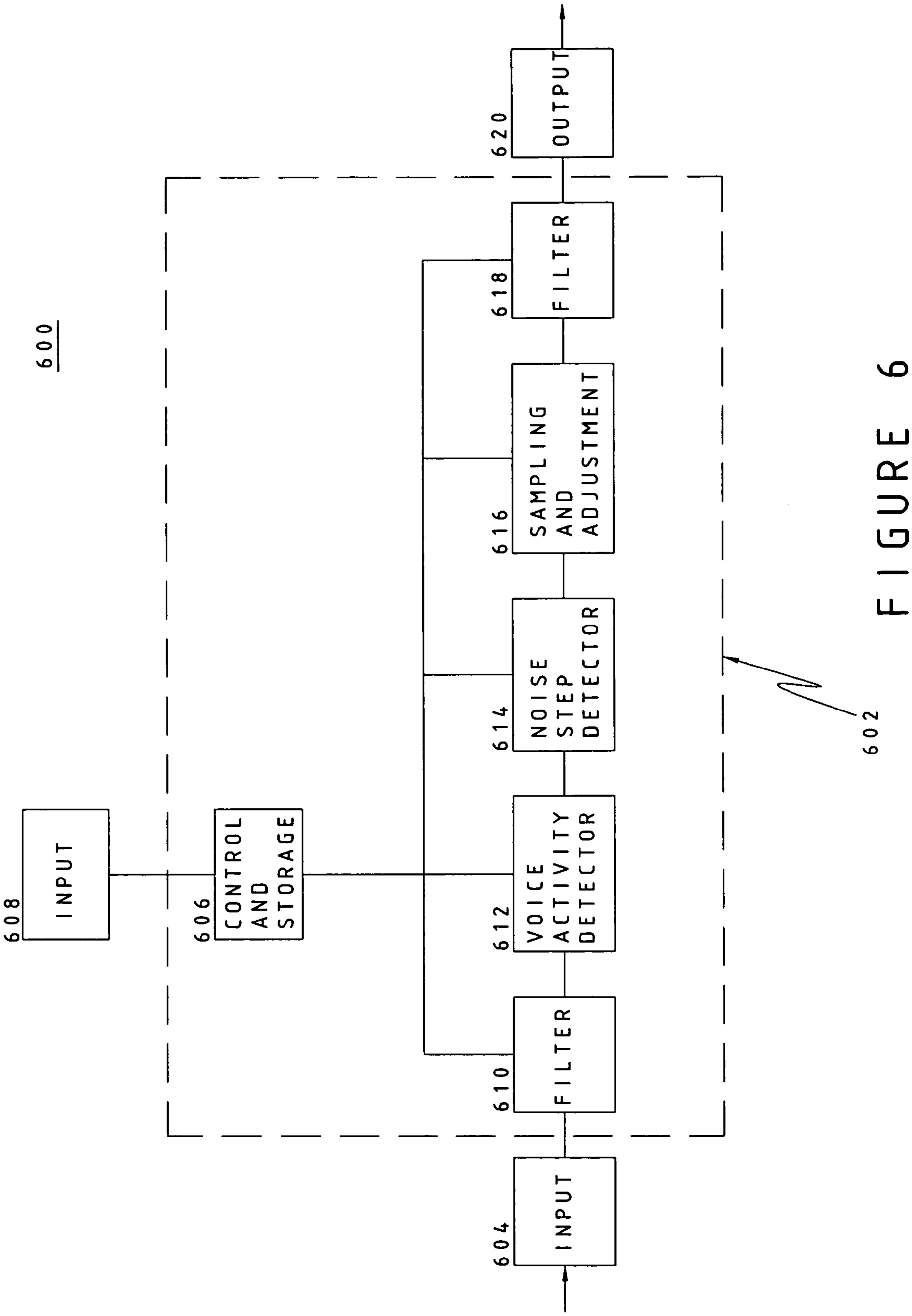
FIG. 6 illustrates a schematic block diagram of a noise cancellation system according to the invention.

An embodiment of the disclosed subject matter in which the previously described process may be implemented is illustrated in FIG. 6 as system 600. The system 600 includes a processor 602 operably connected to a first input means 604, a second input means 608, and an output means 620. The processor 602 comprises a control and storage means 606, a first filtering means 610, a voice activity detector 612, a noise step detector 614, a sampling and adjustment means 616, and a second filtering means 618. The control and storage means 606 may be used to store a control program which carries out computational aspects of the noise cancellation process previously described and to control the computations of the aforementioned components. Such a control and storage means 606 may comprise of but is not limited to any various known storage devices such as a CD-ROM drive, a hard disk, etc. upon which an embodiment of the algorithm depicted in FIG. 5 may be stored. The first input means 604 may comprise of but is not limited to a communications receiver, audio receiver, or like device that may receive electromagnetic signals. The second input means 608 may comprise a keyboard or similar input device in which historical data may be entered into the control and storage means 606 for access by the processor 602 and other components.

An input speech signal is received by the first input means 604 and relayed to the processor 602 wherein an estimation of the noise level is conducted and a windowed Fourier transform may be applied to the input speech signal within the processor 602. The signal magnitude and SNR may be filtered by a filtering means 610 within the processor 602 and delivered to a voice activity detector 612 wherein several noise types such as but not limited to ramping, non-stationary, and Gaussian may be detected and attacked. The filtering means may comprise of but is not limited to known filters such as low pass filters, band pass filters, or other known filters utilized in the filtering of electromagnetic signals and designed for specific electromagnetic signal parameters of an embodiment of the disclosed subject matter. The signal may then be relayed to a noise step detector 614 wherein a large noise step increase or decrease in amplitude or magnitude may be detected and attacked.

The input speech signal is further processed and a spectral gain function is computed and applied to the real and imaginary components of the Fourier transform of the input speech signal in the processor 602. These components are then processed by an inverse Fourier transform for reconstruction of the signal. The signal may be relayed for further processing, slew rate sampling and adjusting, noise histogram updating and noise histogram normalizing in a sampling and adjustment means 616. The sampling and adjustment means may comprise but is not limited to an electronic circuit or the like designed to sample an input signal wherein adjustments to specific parameters of the input signal may be made according to comparisons of the sampled parameters. If this processing is complete, a windowed Fourier transform may be applied to the signal and the signal may be overlapped and added with other previous outputs. If the slew rate adjustment and noise histogram updating and normalizing has not been fully completed, further iterations may be performed. Upon processing of the signal, the signal may be relayed to a filtering means 618 in which remaining noise components are filtered out. The signal is then passed to any number of output means 620 comprising of but not limited to an audio or visual output device, a storage medium or the like.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

What we claim is:

1. A method of reducing a noise component of an input speech signal comprised of signal frames on a channel comprising the steps of:

(a) applying a windowed Fourier transformation to said signal frames;

(b) approximating signal magnitudes of said signal frames;

(c) computing Signal-to-Noise Ratio magnitudes of said signal frames;

(d) detecting voice activity in said channel as a function of conditional comparisons of received Signal-to-Noise Ratios and average Signal-to-Noise Ratio thresholds;

(e) detecting noise activity in said channel as a function of conditional comparisons of at least one of historical voice activity detection values, historical signal values and noise step values;

(f) estimating gain in said signal frames;

(g) applying an estimated noise history to said signal frames to compute a spectral gain function;

(h) applying said spectral gain function to the components of said windowed Fourier transformation; and, (i) applying an inverse Fourier transform to said signal frames thereby reconstructing a noise reduced output signal frame.

2. The method of claim 1 wherein said estimated noise history is retrieved from a database.

3. The method of claim 1 wherein said estimated noise history is sampled from said signal frames.

4. The method of claim 1 wherein said signal frames are overlapped and added to previous signal frames.

5. The method of claim 1 comprising the step of filtering said Signal-to-Noise Ratio magnitude and signal magnitude prior to detecting voice activity in said channel.

6. The method of claim 1 comprising the step of applying a windowed Fourier transform on said noise reduced output signal frame.

7. The method of claim 1 wherein said noise component is Gaussian.

8. The method of claim 1 wherein said noise component is ramped.

9. The method of claim 1 wherein said noise component is non-stationary.

10. The method of claim 1 comprising the step of sampling a slew rate of said noise reduced output signal frame.

11. The method of claim 10 wherein the step of sampling a slew rate comprises the steps of:

(a) starting a counter;

(b) adjusting the sampled slew rate;

(c) encoding a noise sample;

(d) updating a noise histogram;

(e) normalizing said noise histogram;

(f) computing a weighted histogram bin;

(g) decoding a noise estimate;

(h) updating said counter; and, (i) deciding to continue said sampling.

12. The method of claim 11 wherein the adjusting of the sampled slew rate is responsive to a measured error period.

13. The method of claim 11 wherein said counter resets.

14. The method of claim 11 wherein said noise reduced output signal frame is overlapped and added to previous noise reduced output signal frames.

15. The method of claim 11 wherein the step of filtering said average noise filters noise from the noise reduced output signal frame.

16. The method of claim 15 wherein the step of filtering said average noise comprises adapting a post-processed noise level to an acceptable level.

17. The method of claim 11 wherein the entire process is repeated responsive to the presence of additional input speech signals or signal frames.

18. The method of claim 1 wherein said noise reduced output signal frame is overlapped and added to previous noise reduced output signals frames.

19. The method of claim 1 wherein average noise is filtered from the noise reduced output signal frame.

20. The method of claim 19 wherein the step of filtering said average noise comprises adapting a post-processed noise level to an acceptable level.

21. The method of claim 1 wherein the entire process is repeated responsive to the presence of additional input speech signals or signal frames.

22. In a method of filtering a noise component from an input speech signal comprised of signal frames the improvement comprising the steps of:

(a) estimating said noise component present in the input speech signal;

(b) modifying said input speech signal based on an estimation of the noise component;

(c) identifying speech segments from said noise component as a function of conditional comparisons of received Signal-to-Noise Ratios and average Signal-to-Noise Ratio thresholds and as a function of conditional comparisons of at least one of historical voice activity detection values, historical signal values and noise step values; and, (d) adapting a post-processed noise component to an acceptable, noise-reduced level.

23. The method of claim 22 wherein said noise component is ramping in amplitude.

24. The method of claim 22 wherein said noise component is Gaussian.

25. The method of claim 22 wherein said noise component is non-stationary.

26. The method of claim 22 wherein step (c) further comprises the steps of:

(a) using an estimated noise histogram and/or a generated noise histogram compute a spectral gain function;

(b) applying said spectral gain function to the real and imaginary components of a Fourier transform of said input speech signal; and, (c) processing said Fourier transform by an inverse Fourier transform thereby reconstructing a noise reduced speech signal.

27. A system for noise cancellation comprising:

(a) a first input means operably connected to a processor said first input means receiving a speech signal;

(b) a second input means operably connected to said processor wherein historical speech and noise data may be entered into a control and storage means for access by said processor;

(c) an output means operably connected to said processor said output means expressing an output speech signal; and, (d) a processing means operably connected to said first and second input means and said output means, said processing means comprising a control and storage means, a first filtering means, a second filtering means, a voice activity detector, a noise step detector, and a sampling and adjustment means, said voice activity detector detects and attacks noise activity on a frequency channel as a function of conditional comparisons of received Signal-to-Noise Ratios and average Signal-to-Noise Ratio thresholds, and said noise step detector detects and attacks a noise step increase or decrease as a function of conditional comparisons of at least one of historical voice activity detection values, historical signal values and noise step values.

28. The system of claim 27 wherein said first filtering means filters Signal-to-Noise Ratio magnitudes and signal magnitudes.

29. The system of claim 27 wherein said noise activity is ramping, non-stationary, or both.

30. The system of claim 27 wherein said noise step detector detects and attacks a stepping noise component on said frequency channel.

31. The system of claim 27 wherein said sampling and adjustment means samples and adjusts a slew rate and a histogram of said output speech signal.

32. The system of claim 27 wherein said second filtering means adapts a post-processed noise level to an acceptable level.

33. A method of noise cancellation in a received speech signal comprised of signal frames comprising the steps of:

(a) applying a windowed Fourier transform to said signal frames;

(b) estimating a noise component present in said signal frames;

(c) modifying said signal frames based on a calculated noise estimate;

(d) identifying speech segments from said noise component as a function of conditional comparisons of received Signal-to-Noise Ratios and average Signal-to-Noise Ratio thresholds and as a function of conditional comparisons of at least one of historical voice activity detection values, historical signal values and noise step values; and, (e) adapting a post-processed noise level to an acceptable level.

34. The method of claim 33 wherein step (b) further comprises the steps of:

(a) approximating magnitudes of said signal frames;

(b) computing Signal-to-Noise Ratio magnitudes of said signal frames;

(c) detecting any noise components on a channel;

(d) detecting a stepping noise component on said channel; and, (e) estimating a gain in said noise component.

35. The method of 34 wherein said noise components comprises ramping noise components, non-stationary noise components, or both.

36. The method of claim 33 wherein step (c) further comprises the step of computing a spectral gain function from an estimated noise history.

37. The method of claim 36 further comprising the steps of:

(a) applying said spectral gain function to the real and imaginary components of a Fourier transform of said signal frames; and, (b) applying an inverse Fourier transform thereby reconstructing noise reduced signal frames.

38. The method of claim 33 wherein the step of identifying speech segments from said noise component further comprises applying a windowed Fourier transform on an output signal frame.

39. The method of claim 33 wherein adapting a post-processed noise component to an acceptable level further comprises filtering average noise from an output signal frame.

40. The method of claim 33 wherein said noise component is ramping in amplitude.

41. The method of claim 33 wherein said noise component is Gaussian.

42. The method of claim 33 wherein said noise component is non-stationary.

* * * * *